United States Patent Office 3,452,629
Patented July 1, 1969

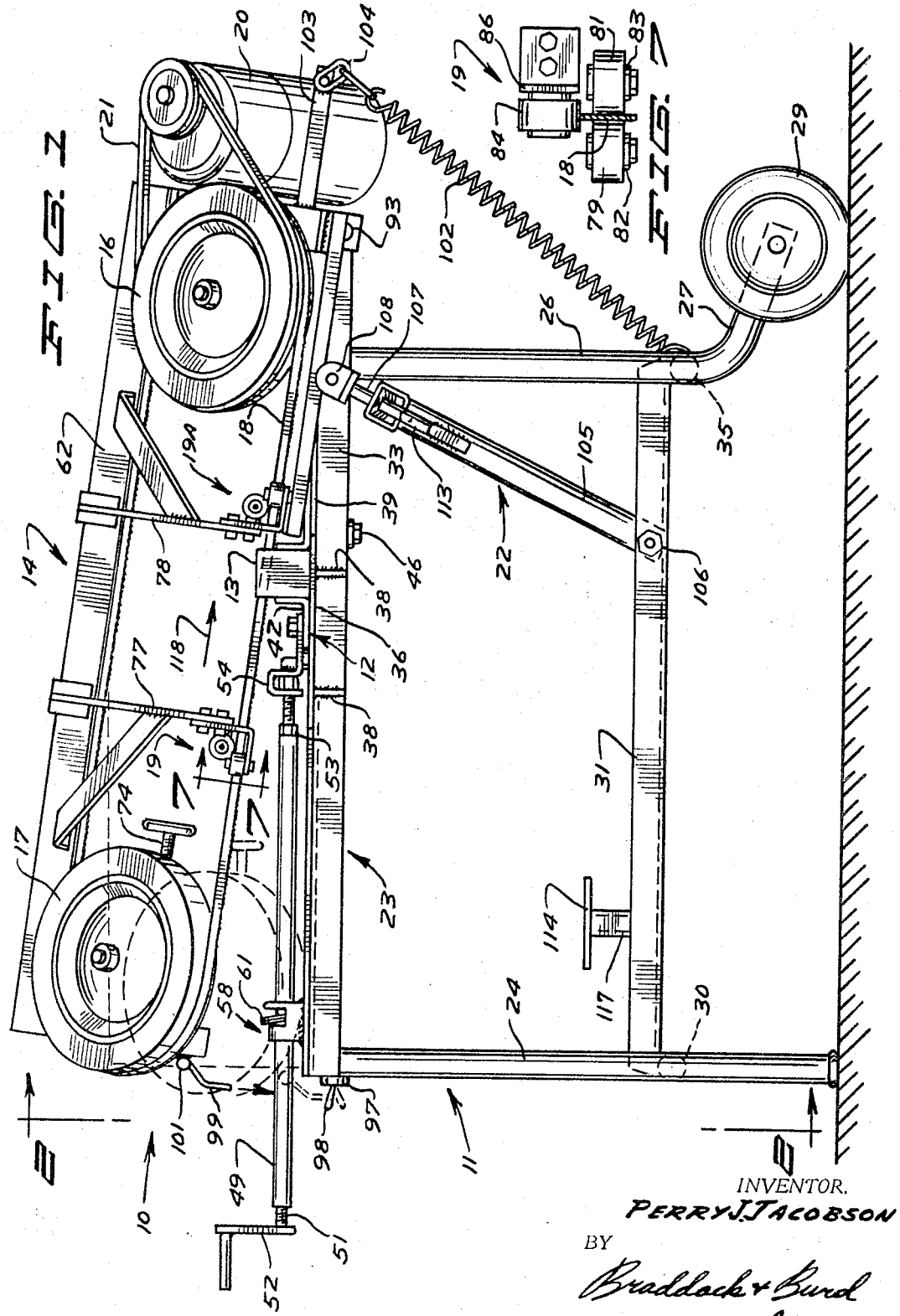

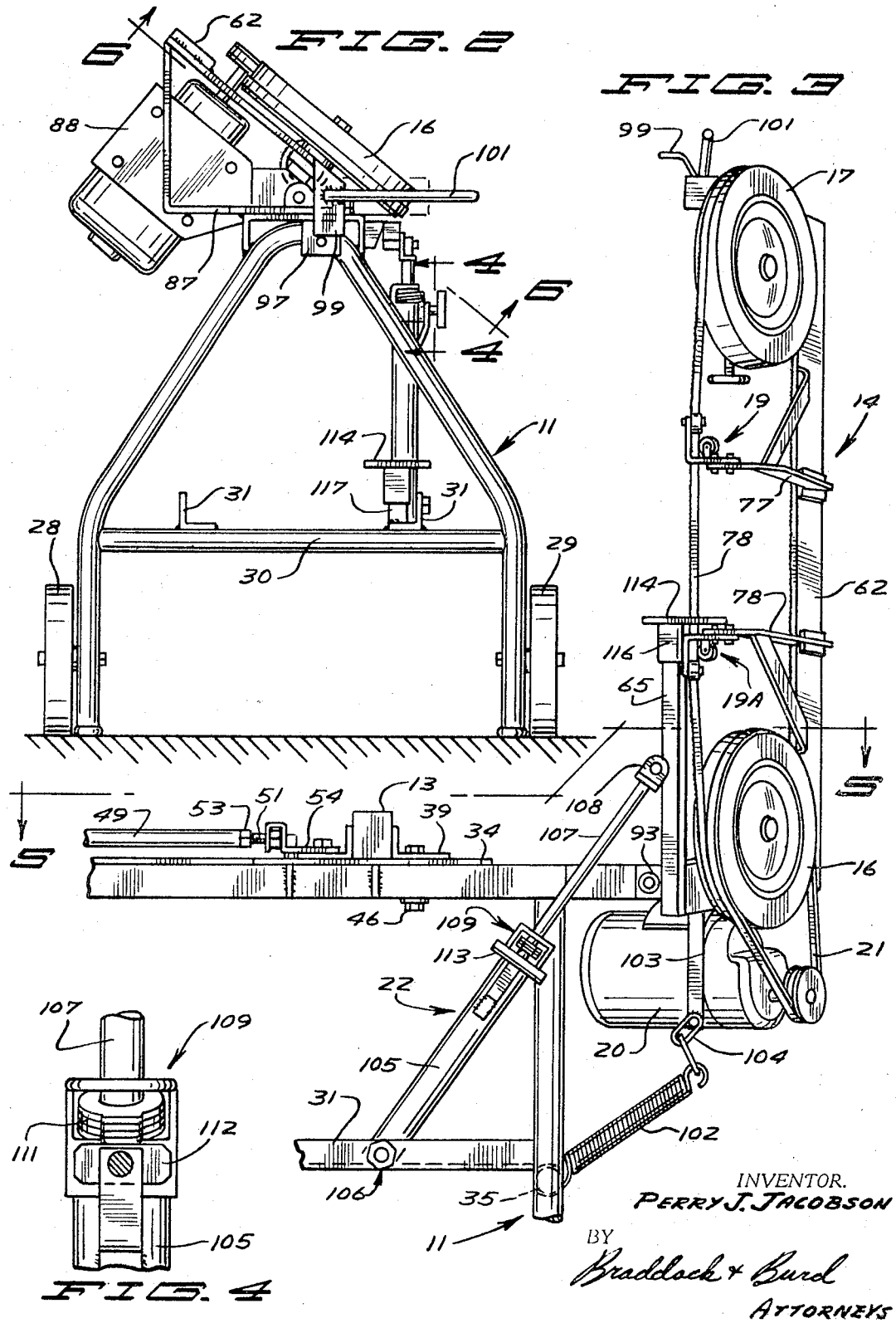

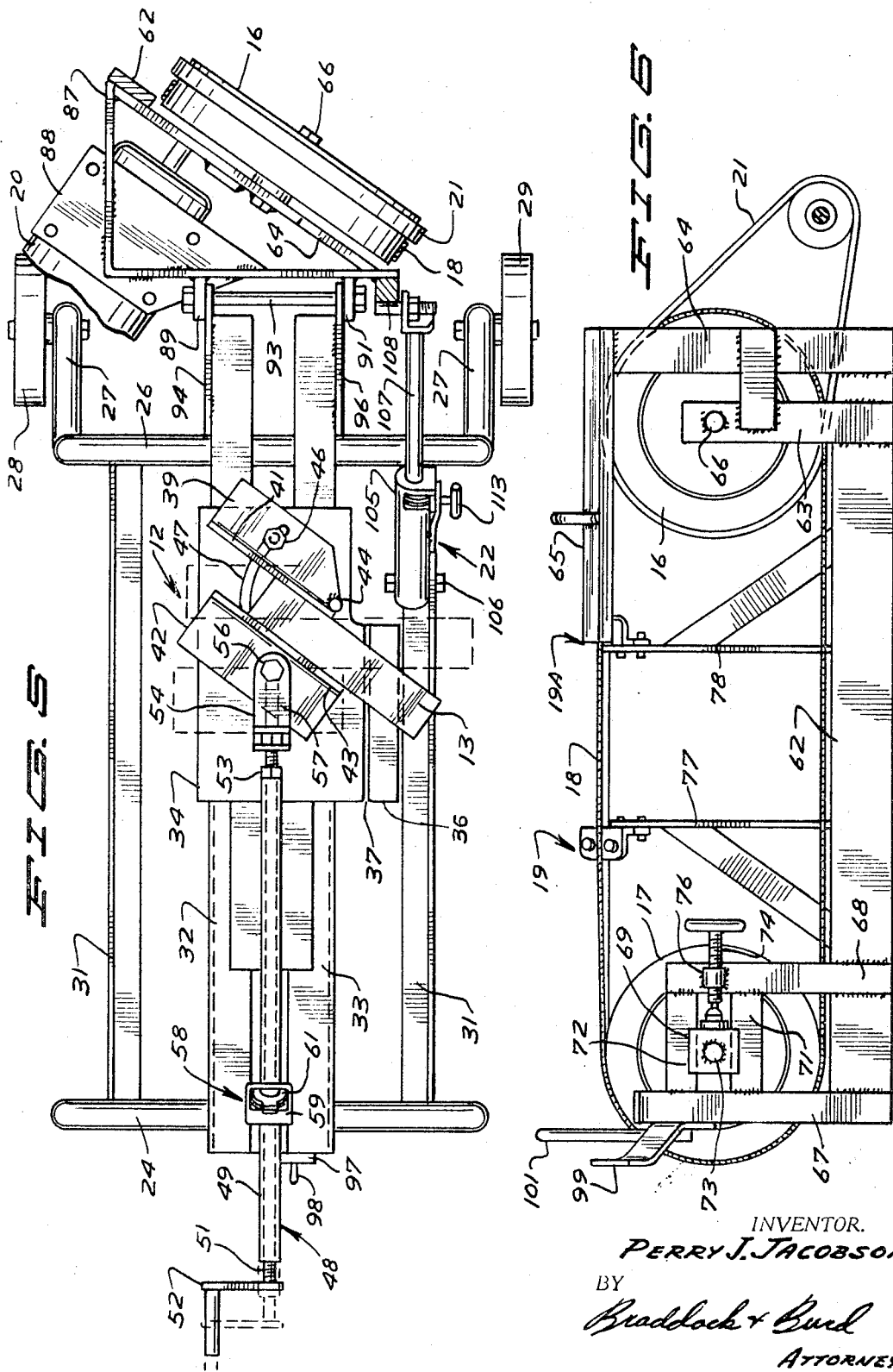

3,452,629
TILTING BAND SAW
Perry J. Jacobson, Plankinton, S. Dak. 57368
Filed Aug. 22, 1966, Ser. No. 574,005
Int. Cl. B26d 1/48
U.S. Cl. 83—201        6 Claims

ABSTRACT OF THE DISCLOSURE

A band sawing machine having an arm pivotally mounted on one end of a work supporting table. An endless band is trained about wheels rotatably mounted on opposite ends of the arm. A gear head motor mounted on the arm drives one of the wheels. A releasable lock means holds the arm means in an upright position. When the lock is released the arm means can move down toward the table lowering the saw band through the workpiece held in a vise on the table.

This invention relates to a cutting machine and more particularly to a portable band saw having an endless cutting band which can be selectively moved to a horizontal position and held in an upright position.

Briefly described, the cutting machine of this invention has a portable frame having an adjustable vise holding means operable to support and hold a workpiece. Pivotally mounted on one end of the frame is an elongated arm means movable to horizontal and vertical positions. Rotatably mounted on opposite ends of the arm means are spaced wheel means. Trained about the wheel means is an endless saw band. A motor mounted on the arm means is drivably connected to one of the wheel means to rotate the wheel means moving the cutting band.

An extensible and contractable unit having a releasable lock is used to hold the arm means in an upright position enabling the saw to be utilized as a vertical band saw. When the lock is released the arm means can be moved to a horizontal position. As the arm means is lowered the moving band will cut its way through the workpiece held in the vise holding means. The arm means continues to move in a downward direction until it actuates a switch to terminate the power to the motor thereby automatically stopping the machine.

In the drawings:

FIGURE 1 is a side elevational view of the cutting machine of the invention showing the cutting arm moving to the horizontal position;

FIGURE 2 is a sectional view taken along the line 2—2 of FIGURE 1;

FIGURE 3 is a fragmentary side view of the cutting machine showing the cutting arm locked in the vertical position;

FIGURE 4 is an enlarged sectional view taken along the line 4—4 of FIGURE 2;

FIGURE 5 is a sectional view taken along the line 5—5 of FIGURE 3;

FIGURE 6 is an enlarged sectional view taken along the line 6—6 of FIGURE 2; and FIGURE 7 is an enlarged sectional view taken along the line 7—7 of FIGURE 1.

Referring to the drawings there is shown in FIGURE 1 a cutting machine of this invention indicated generally at 10. The machine has a movable frame 11 carrying a work holding unit indicated generally at 12. A workpiece 13 as a metal bar is supported in holding unit 12. Pivotally mounted to one end of frame 11 is an elongated arm indicated generally at 14 rotatably carrying a pair of spaced wheels 16 and 17. An endless saw band 18 is trained about the wheels. Spaced guide means indicated generally at 19 and 19A cooperate with the working or midsection of the lower run of band 18 to hold the midsection of the band in a common vertical plane while the band is cutting workpiece 13. A power means 20, as an electric motor having a speed reduction unit mounted on arm 14 is drivably connected to wheel 16 by an endless belt 21. Operation of motor 20 rotates wheel 16 which in turn moves the saw band 18 around the spaced wheels 16 and 17. As shown in FIGURE 3, an extensible and contractable holding unit 22 is used to hold arm 14 in an upright position placing the working section of band 18 in a vertical position.

Frame 11 comprises an elongated horizontal table 23 supported on a front inverted U-shaped member 24 and a rear inverted U-shaped member 26. The lower ends of member 26 have downwardly and rearwardly projected extensions 27 rotatably carrying wheels 28 and 29. Horizontal brace members 31 are secured at their opposite ends to transverse members 30 and 35 extended between and connected to the legs of the inverted U-shaped members. Table 23 comprises a pair of longitudinal center beams 32 and 33 secured to the top sections of U-shaped members 24 and 26. A flat plate 34 mounted on the midsection of the center beams provides a base for work holding unit 12. A side plate 36 extended along one side of plate 34 is spaced along a longitudinal side of plate 34 to provide an elongated slot or space 37 for receiving saw band 18 as it moves through workpiece 13. As shown in FIGURE 1, a pair of gusset members 38 secure plate 36 to the side of center beam 33.

As shown in FIGURE 5, work holding unit 12 is mounted on top of plate 34 inwardly from longitudinal space 37. Unit 12 comprises a first adjustable angle member 39 having an upright flange 41 and a second angle member 42 having an upright flange 43 spaced from and facing flange 41. A pivot pin 44 pivotally mounts one end of angle member 39 to plate 34. The angular position of angle member 39 is adjusted with a nut and bolt assembly 46 which projects through an arcuate slot 47 in plate 34. As shown in broken lines, member 39 can be moved to a transverse position. The nut of the nut and bolt assembly 46 is located below plate 34 and may be provided with a crank handle to facilitate angular adjustment of angle member 39.

Angle member 42 is moved toward and away from angle member 39 by a control unit indicated generally at 48 to clamp workpiece 13 between upright flanges 41 and 43. Control unit 48 comprises an elongated tubular member 49 extended longitudinally of beams 32 and 33. A threaded rod 51 projects through tubular member 49 and is threaded through a nut 53 secured to the inner end of member 49. A crank 52 secured to the outer end of rod 51 is used to facilitate rotation of the rod. Rod 51 is connected to angle member 42 by a link 54 and a pivot pin 56 pivotally connecting the midsection of angle member 42 to the forward end of link 54. The opposite end of link 54 has a U-shaped head accommodating a head on the inner end of rod 51. Pivot pin 56 projects through a longitudinal slot 57 in plate 34 which acts as a longitudinal guide for angle member 42. Pivot pin 56 also allows angle member 42 to pivot about a vertical axis permitting the upright flange 43 to move into surface engagement with the side of workpiece 13.

Control unit 48 is adjustably mounted on the outer ends of center beams 32 and 33 with a lock or brake assembly indicated generally at 58. Brake assembly 58 is a rod brake comprising a housing 59 having longitudinal openings accommodating tubular member 49. The housing has an open top accommodating a plurality of washers 61 located around the tubular member with a slide fit. Washers 61 are biased by a spring (not shown) to a clamp position to lock the tubular member against housing 59. To release the tubular member 49 washers 61 are moved to a vertical position or a position generally transverse to the longitudinal axis of tubular member 49. This permits the tubular member to be moved longitudinally providing for quick adjustment of angle member 42. As soon as the angle member 42 engages the workpiece 13, brake 58 is applied thereby holding tubular member 49. On rotation of crank 52 rod 51 is threaded through a nut 53 clamping workpiece 13 between the upright flanges 41 and 43 of the angle members.

As shown in FIGURE 6, arm 14 has a longitudinal beam 62 extended adjacent the upper run of band 18. Projected normally from one end of beam 62 are a pair of inner legs 63 and 64. A longitudinal post 65 is secured to the outer end of leg 64 and a bearing and axle assembly 66 is secured to the outer end of leg 63. Wheel 16 is rotatably mounted on axle assembly 66. The opposite end of beam 62 has a pair of outer legs 67 and 68 connected at their outer ends by a pair of spaced guides 69 and 71. A slide block 72 carrying a bearing and axle assembly 73 for wheel 17 is slidably mounted between the guides 69 and 71. Block 72 cooperates with a threaded rod 74 threaded through a sleeve 76 secured to leg 68 to hold and adjust the longitudinal position of wheel 17 and thereby applying tension on band 18.

A pair of spaced normally disposed supports 77 and 78 are secured to the midsection of beam 62. Guide units 19 and 19A are secured to the outer end of supports 77 and 78 respectively. As shown in FIGURE 7, guide unit 19 has a pair of horizontal rollers 79 and 81 located on opposite sides of band 18. Brackets 82 and 83 secured to the ends of supports 77 and 78 rotatably support rollers 79 and 81. The teeth of band 18 are below the surface of the horizontal rollers and are maintained in this vertical position by a vertical roller 84 riding on the top edge of the band. Roller 84 is rotatably mounted on a bracket 86 secured to the outer end of support 77. The guide unit 19A has identical horizontal and vertical rollers.

As shown in FIGURE 5, an angle member 87 is secured to the inner end of beam 62 and the outer end of leg 64. A flat plate 88 secured to member 87 is used to support motor 20. The horizontal leg of angle member 87 located adjacent the ends of beams 32 and 33 has a pair of inwardly projected ears 89 and 91 accommodating a transverse bolt 93. Bars 94 and 96 secured to beams 32 and 33 have aligned holes for bolt 93 thereby pivotally mounting arm 14 on the end of the beams 32 and 33.

Located adjacent the opposite ends of beams 32 and 33 and mounted on frame 24 is a switch 97 used to control motor 20. Switch 97 has an actuator 98 movable to an up position to turn switch 97 "on" and movable to a down position as shown in broken lines in FIGURE 1 to turn switch 97 "off." Secured to the outer end of leg 67 is a downwardly projected off-set finger 99 located in alignment with switch actuator 98. On downward movement of arm 14 finger 99 engages actuator 98 turning the switch 97 to the "off" position. This is done when band 18 moves into the space 37 after it has cut workpiece 13.

As arm 14 moves in a downward direction it moves against the force of a counterbalancing spring 102. As shown in FIGURE 1, spring 102 is attached at its upper end to a rearwardly directed projection 103 by a pair of links 104. The lower end of spring 102 is secured to transverse member 35.

As shown in FIGURE 3, arm 14 is held in an upright position by holding unit 22 thereby converting the machine to a vertical band saw. Holding unit 22 comprises a tubular member 105 pivotally mounted on brake member 31 by a nut and bolt assembly 106. An elongated rod 107 telescopes into tubular member 105. The upper end of rod 107 is pivotally mounted to post 65 by pin 108 secured to the post. Relative movement between tubular member 105 and rod 107 is controlled by a rod brake indicated generally at 109. The brake comprises a plurality of washers 111 positioned about rod 107 and enclosed in a housing secured to the upper end of tubular member 105. A spring (not shown) biases the washers 111 to a clamp position thereby preventing relative movement between rod 107 and tubular member 105. Washers 111 are moved to a transverse release position by a cam 112 pivotally mounted on tubular member 105 and rotated by a handle 113. Handle 113 is moved a quarter turn to either actuate or release the washers.

A removable table 114 telescopes over the upper end of posts 65 to provide a support for the workpiece. Table 114 has a downwardly projected extension 116 which telescopes over the upper end of leg 65. As shown in FIGURES 1 and 2, table 114 is stored on a projection 117 attached to brace member 31.

The machine may be used as a table saw by releasing brake 109. This is accomplished by rotating handle 113 approximately one-quarter turn wherein the cam 112 holds washers 111 substantially normal to the axis of rod 107. Arm 14 is now free to pivot forward about bolt 93 in a downward direction against the biasing force of counterbalancing spring 102. Brake 109 can be applied to hold arm 14 in any angular position. Before workpiece 13 is placed on table 34 angle member 39 is angularly adjusted to the angle of cut desired on the workpiece. The nut of the nut and bolt assembly 46 is loosened and angle member 39 is angularly moved to the desired position. Workpiece 13 is placed on plate 34 between angle members 39 and 42. With brake 58 released tubular member 49 is moved to position flange 43 in engagement with workpiece 13. Rotation of crank 52 turns rod 51 through nut 53 to clamp workpiece 13 between upright flanges 41 and 43.

Motor 20 is energized by moving switch actuator 98 to the up position thereby coupling the motor to a source of power. The motor 20 through belt 21 drives wheel 16 which in turn moves band 18 in the direction of arrow 118 around wheels 16 and 17 and through guide units 19 and 19A. The guide units place a slight twist in the lower run of band 18 positioning the lower run of the band in a generally upright plane. The arm 14 is moved in a downward direction by applying a pressure on handle 101 thereby forcing the band through the workpiece 13. Band 18 will saw completely through workpiece 13 and move into the elongated slot 37. Motor 20 will be turned off when finger 99 moves the switch actuator 98 to the down position.

The machine may be converted into an upright band saw by merely raising arm 14 to a vertical position as shown in FIGURE 3 and locking the holding unit 22. This is accomplished by merely rotating the handle 113 one-quarter turn releasing cam 112 from washers 111. Table 114 can be mounted on the end of post 65 to provide a work support in an area surrounding band 18.

While there has been shown and described a preferred embodiment of the invention, it is to be understood that various omissions, substitutions, changes in form and details in the cutting machine illustrated may be made by those skilled in the art without departing from the spirit of the invention. The invention is defined in the following claims.

The embodiments of the invention in which an exclusive property or privilege is claimed are defined as follows:

1. A cutting machine comprising a frame, a generally horizontal table secured to the frame, arm means pivotally mounted on the table for movement in the upright plane of the table to a first position above and generally parallel to said table and to a second upright position generally normal to said table adjacent one end of said table, pivot means mounting one end of the arm means on one end of the table providing the arm means with pivotal movement about an axis generally traverse to the table, at least one pair of spaced wheel means rotatably mounted on said arm means, on endless saw band trained about said wheel means, power means mounted on the arm means, and drive means connecting the power means with at least one wheel means thereby moving the band around the wheel means.

2. The cutting machine of claim 1 including releasable lock means operable to hold the arm means in an upright position.

3. A cutting machine comprising: a frame, arm means pivotally mounted on the frame for movement to first and second positions, at least one pair of spaced wheel means rotatably mounted on said arm means, an endless saw band trained about said wheel means, power means mounted on the arm means, drive means connecting the power means with at least one wheel means thereby moving the band around the wheel means, a table mounted on said frame, work holding means mounted on said table, said work holding means having a first adjustable member, a second movable member, and a control unit connected to the movable member for moving the movable member toward the adjustable member, first pivot means connecting one end of the first member to the table, fastening means cooperating with an arcuate slot in the table to hold the first member in an adjusted position on the table and second pivot means connected to connected to the movable member for moving the movable member toward the adjustable member, said control unit comprises a tubular member, releasable brake means coupling the tubular member to the frame to selectively hold and allow movement of the tubular member relative to the frame, a rod located within and threaded to a portion of the tubular member and link means connecting the rod with the movable member whereby the position of said movable member on the table can be changed by moving the tubular member or rotating the rod.

5. The cutting machine of claim 1 wherein said power means is a gear head electric motor mounted on one end of the arm means and said drive means is an endless belt directly coupling the motor with said one wheel means.

6. The cutting machine of claim 1 including an extensible and contractable holding unit for locking the arm means to the frame, said unit having a first member secured to the frame, a second member secured to the arm means, and releasable lock means cooperating with the first member and second member to selectively allow and prevent relative movement between said members whereby the arm means can be locked to the frame.